United States Patent Office 3,705,174
Patented Dec. 5, 1972

---

3,705,174
POLYHALOALKYL BENZIMIDAZOLES
Michael H. Fisher, Somerville, Dale R. Hoff, Basking Ridge, and Richard J. Bochis, East Brunswick, N.J., assignors to Merck & Co., Inc., Rahway, N.J.
No Drawing. Filed Feb. 27, 1970, Ser. No. 15,225
Int. Cl. C07d 49/38
U.S. Cl. 260—309.2
5 Claims

ABSTRACT OF THE DISCLOSURE

Trihalo- and tetrahalobenzimidazoles characterized by having a trifluoromethyl or pentafluoroethyl group at the 2-position and a 1-ether or 1-ester substituent at the 1-position are active as anthelmintics and as pesticides.

---

This invention relates to new compositions of matter classifiable in the field of organic chemistry as 1,2-disubstituted trihalo- and tetrahalobenzimidazoles. More particularly, this invention relates to trihalo- and tetrahalobenzimidazoles characterized by having at the 2-position a trifluoromethyl or pentafluoroethyl substituent and by having at the 1-position a 1-ether or 1-ester substituent; to methods for preparing such compounds; and to anthelmintic and pesticidal formulations containing such compounds as the essential active ingredient.

In its composition aspect, therefore, the instant invention may be described as residing in the concept of benzimidazoles having the formula:

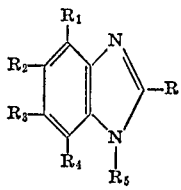

wherein

R is a member selected from the group consisting of trifluoromethyl and pentafluoroethyl;

$R_1$, $R_2$, $R_3$ and $R_4$ are members selected from the group consisting of hydrogen and halogen selected from the group consisting of fluorine, chlorine, bromine and iodine, provided that only one of $R_1$, $R_2$, $R_3$ and $R_4$ can be hydrogen; and $R_5$ is a member selected from the group consisting of hydroxy, loweralkoxy, loweralkenyloxy, carboxyloweralkoxy and loweralkyl esters thereof, aminoloweralkoxy containing from 2 to 8 carbon atoms in the alkoxy moiety and the N-loweralkyl N,N-diloweralkyl and triloweralkylammonium halide derivatives thereof, phosphonoloweralkoxy and loweralkyl esters thereof, phosphatoloweralkoxy and loweralkyl esters thereof, loweralkylthioloweralkoxy and the sulfoxide and sulfone derivatives thereof, sulfoloweralkoxy, C-amidinoloweralkoxy and $N_1$- and $N_2$-loweralkyl derivatives thereof, N-amidinoloweralkoxy wherein the amidino moiety is derived from a lower alkanoic acid and the N-loweralkyl derivatives thereof, biguanidoloweralkoxy, guanidinoloweralkoxy and the $N_1$, $N_2$ and $N_3$ loweralkyl derivatives thereof, aminoguanidinoloweralkoxy and the N′, $N_1$, $N_2$ and $N_3$ loweralkyl derivatives thereof, imidazolylaminolower alkoxy and the 1-loweralkyl derivatives thereof, 1,4,5,6-tetrahydropyrimidinylaminoloweralkoxy and the 1-loweralkyl derivatives thereof, thiazolinylaminoloweralkoxy, thiazinylaminoloweralkoxy, imidazolinoloweralkoxy and the 1-loweralkyl derivatives thereof, 1,4,5,6-tetrahydropyrimidinoloweralkoxy and the 1-loweralkyl derivatives thereof, loweralkanoyloxy, α - aminocarboxyloweralkoxy, glycosyloxy, p - loweralkylphenacyloxy and p-loweralkoxyphenacyloxy;

and alkali metal, alkaline earth metal and pharmaceutically acceptable amine salts thereof when $R_5$ is carboxylower alkoxy, sulfoloweralkoxy, phosphonoloweralkoxy, phosphatoloweralkoxy; or α-aminocarboxyloweralkoxy; and salts thereof with pharmaceutically acceptable acids when $R_1$ is aminoloweralkoxy, C-amidinoloweralkoxy, N-amidinoloweralkoxy, biguanidoloweralkoxy, guanidinoloweralkoxy, aminoguanidinoloweralkoxy, imidazolinylaminoloweralkoxy, tetrahydropyrimidinylaminoloweralkoxy, thiazolinylaminoloweralkoxy, thiazinylaminoloweralkoxy, imidazolinoloweralkoxy, tetrahydropyrimidinoloweralkoxy or α-aminocarboxyloweralkoxy.

As used above, the terms, loweralkyl, loweralkoxy and loweralkanoyloxy are intended to include both straight and branched chain loweralkyl, loweralkoxy and loweralkanoyloxy groups containing, unless otherwise specified, from 1 to 8 carbon atoms in the alkyl, alkoxy or alkanoyloxy moiety. Typical of such loweralkyl, loweralkoxy and loweralkanoyloxy groups are, for example, methyl, ethyl, propyl, isopropyl, n-butyl, amyl, n-hexyl, methoxy, ethoxy, propoxy, n-octyloxy, formyloxy, acetyloxy, propionyloxy, isobutyryloxy and n-hexanoyloxy. The term, loweralkenyloxy, is intended to include both straight and branched chain loweralkenyloxy groups containing from 2 to 8 carbon atoms in the alkenyloxy moiety such as, for example, vinyloxy, allyloxy, propenyloxy, crotyloxy, isobutenyloxy and octenyloxy. The triloweralkylammonium halide derivatives of the 1-aminoloweralkoxy substituted benzimidazoles described above will include the fluoride, chloride, bromide, and iodide quaternary salts. The terms, alkali metal salt and alkaline earth metal salt, are intended to include salts of alkali and alkaline earth metals such as for example, lithium, sodium, potassium, cesium, calcium, magnesium, barium and strontium. Pharmaceutically acceptable amine salts will include those derived from amines such as, for example, ammonia, ethanolamine, diethanolamine, guanidine, arginine, lysine, ethylenediamine, piperazine and morpholine. Typical pharmaceutically acceptable acid salts will include those derived from inorganic and organic acids such as hydrochloric acid, sulfuric acid, phosphoric acid, acetic acid, valeric acid, lactic acid, caproic acid, aspartic acid, glutamic acid, citric acid and tartaric acid.

The instant invention is based upon the discovery that the benzimidazoles described above show inherent applied use characteristics as anthelmintic agents, particularly again Haemonchus sp., Chabertia sp. and Oesophagostomum sp., and as pesticides (e.g. bactericides, nematocides and particularly as fungicides). The physiological activity of the benzimidazoles of this invention has been confirmed by standard laboratory techniques. It is contemplated that formulations containing the benzimidazoles of this invention as the essential active ingredient will be employed in the treatment and control of helminthiasis in animals and as pesticides. Moreover it has been found that the 1-ether and 1-ester benzimidazoles of this invention are more soluble in water and/or in lipids and organic solvents than the corresponding 1-unsubstituted compounds and accordingly are more readily usable in liquid formulations.

The novel benzimidazoles of this invention wherein the substituent at the two position is trifluoromethyl or pentafluoroethyl and the substituent at the 1-position is hydroxy may be prepared by employing as the starting material any desired trihalo-o-nitroaniline or tetrahalo-o-nitroaniline and treating such nitroaniline with trifluoroacetic acid or pentafluoropropionic acid or the corresponding acid anhydrides to obtain the corresponding trifluoroacetamidonitrobenzene or pentafluoropropionamidonitrobenzene. This reaction, conveniently, is carried out by refluxing a mixture of the nitroaniline and the appropriate acid or acid anhydride for about 1 to about 4 hours. Evaporation and/or dilution of the reaction mixture with a non-polar organic solvent such as hexane precipitates the product which then may be recovered in substantially pure form by filtration.

The trifluoroacetamidonitrobenzene or pentafluoropropionamidonitrobenzene so produced then may be subjected to a reductive cyclization to obtain the corresponding trihalo or tetrahalo 1-hydroxy-2-trifluoromethylbenzimidazole or 1-hydroxy-2-pentafluoroethylbenzimidazole. Reductive cyclization may be carried out by conventional hydrogenation techniques at ambient temperatures and at pressures between about 30 to about 50 p.s.i. using conventional hydrogenation catalysts such as palladium on carbon. Hydrogenation is continued until 2 moles of hydrogen is absorbed. The product may be recovered by filtering off the catalyst and evaporating the solvent followed by recrystallization of the residue from a suitable organic solvent.

As noted above, the trihalo and tetrahalo 2-trifluoromethylbenzimidazoles and 2 - pentafluoroethylbenzimidazoles of this invention may bear a variety of oxy substituents at the 1-position in addition to the 1-hydroxy group. In general, these substituents may be introduced at the 1-position by conventional techniques involving derivatization of the trihalo and tetrahalo 1-hydroxy-2-trifluoromethylbenzimidazoles and 1-hydroxy-2-pentafluoroethylbenzimidazoles as prepared by the techniques described above. Thus, for example, a loweralkoxy group may be introduced at the 1-position by treating a solution of a trihalo or tetrahalo 1-hydroxy-2-trifluoromethylbenzimidazole or 1-hydroxy-2-pentafluoroethylbenzimidazole in a suitable organic solvent with a loweralkyl halide in the presence of a base such as an alkali metal alkoxide, an alkali metal hydroxide or sodium hydride. The reaction may be carried out at temperatures ranging from room temperature to 100° C. and is usually complete in about 2 to about 30 hours. The trihalo or tetrahalo 1-loweralkoxy-2-trifluoromethylbenzimidazoles or 1-loweralkoxy-2-pentafluoroethylbenzimidazoles so produced then may be recovered and purified by conventional techniques.

The same type of reaction may be employed to introduce various additional substituents at the 1-position. Thus, a trihalo or tetrahalo 1-hydroxy-2-trifluoromethylbenzimidazole or 1-hydroxy-2-pentafluoroethylbenzimidazole in a suitable organic solvent, and in the presence of a base, may be treated with a loweralkenyl halide, a haloloweralkanoic acid (preferably in the form of an alkali metal salt), a loweralkyl ester of a haloloweralkanoic acid, a haloloweralkylsulfonic acid (preferably in the form of an alkali metal salt), and a glycosyl halide to produce the corresponding trihalo or tetrahalo 1-loweralkenyloxy, 1-carboxyloweralkoxy, 1-carboxyloweralkoxy loweralkyl ester, 1-sulfoloweralkoxy and glycosyloxy 2 - trifluoromethylbenzimidazole or 2 - pentafluoroethylbenzimidazole. Similarly, the 1-hydroxybenzimidazole may be treated with a haloloweralkylphosphonic acid (preferably in the form of an alkali metal salt), a haloloweralkylphosphonic acid loweralkyl ester, a loweralkanoic acid halide, a loweralkylthioloweralkyl halide, an imidazolinoloweralkylhalide or a 1-loweralkyl derivative thereof, a 1,4,5,6-tetrahydropyrimidinoloweralkyl halide or a 1-loweralkyl derivative thereof, an α-aminocarboxyloweralkyl halide, an α-halo-p-loweralkoxyacetophenone or an α-halo-p-loweralkylacetophenone to produce the corresponding trihalo or tetrahalo 1-phosphonoloweralkoxy, 1 - phosphonoloweralkoxy loweralkyl ester, 1-loweralkanoyloxy-, 1-loweralkylthioloweralkoxy-, 1-imidazolinoloweralkoxy-, 1-(1-loweralkylimidazolinolower-alkoxy) - 1 - (1,4,5,6-tetrahydropyrimidinoloweralkoxy)- 1 - (1 - loweralkyl - 1,4,5,6 - tetrahydropyrimidinolower-alkoxy)-α-aminocarboxyloweralkoxy, 1 - p - loweralkoxyphenacyloxy- and 1-p-loweralkylphenacyloxy-2-trifluoromethylbenzimidazole or 2-pentafluoroethylbenzimidazole.

The trihalo and tetrahalo 2-trichloromethylbenzimidazoles and 2-pentafluoromethylbenzimidazoles of this invention wherein the 1-substituent is aminoloweralkoxy may be prepared by treating the corresponding 1-hydroxybenzimidazole, in the manner described above, with a N-haloloweralkylphthalimide to produce the corresponding trihalo or tetrahalo 1-(N-phthalimidoloweralkoxy)-2-trifluoromethylbenzimidazole or 1-(N-phthalimidoloweralkoxy) - 2 - pentafluoroethyl benzimidazole which, upon treatment with hydrazine hydrate, is converted into the corresponding 1-aminoloweralkoxy compound. The phthalimidoloweralkoxy intermediate, in a suitable organic solvent, is refluxed in the presence of hydrazine hydrate for 1 to 4 hours. Evaporation of the solvent followed by extraction with dilute mineral acid and subsequent basification of the acid extract precipitates the 1-aminoloweralkoxy benzimidazole which is recovered by conventional techniques.

The N-loweralkyl, N,N-diloweralkyl and triloweralkyl ammonium halide derivatives of the trihalo and tetrahalo 1-aminoloweralkoxy-2-trifluoromethylbenzimidazoles and 1-aminoloweralkoxy - 2 - pentafluoroethylbenzimidazoles prepared above conveniently may be prepared by first treating a trihalo or tetrahalo 1-hydroxy-2-trichloromethylbenzimidazole or 1-hydroxy-2-pentafluoroethylbenzimidazole in the presence of a base with a loweralkyl dihalide to form the corresponding 1-haloloweralkoxybenzimidazole. This reaction is carried out in the manner already described. The 1-haloloweralkoxybenzimidazole intermediate then may be treated with a loweralkylamine, a diloweralkylamine or a triloweralkylamine to obtain the desired trihalo or tetrahalo 2-trifluoromethylbenzimidazole or 2-pentafluoroethylbenzimidazole having a N-loweralkylaminoloweralkoxy, a N,N-diloweralkylaminoloweralkoxy or a loweralkoxy triloweralkylammonium halide group at the 1-position.

Those benzimidazoles of the instant invention wherein the substituent at the 1-position is imidazolaminoloweralkoxy or a 1-loweralkyl derivative thereof, 1,4,5,6-tetrahydropyrimidinylaminoloweralkoxy or a 1-loweralkyl derivative thereof, thiazolinylaminoloweralkoxy, thiazinylaminoloweralkoxy and guanidinoloweralkoxy may be prepared by treating the corresponding 1-aminoloweralkoxybenzimidazole, as prepared above, with 2-methylthio-2-imidazoline or a 1-loweralkyl derivative thereof, 2-methylthio-1,4,5,6-tetrahydropyrimidine or a 1-loweralkyl derivative thereof, 2-methylthio-2-thiazoline, 2-methylthio-2-thiazine or 2-methyl-2-thiopseudourea, respectively. The reaction is carried out in a suitable organic solvent and, conveniently, is carried out by refluxing the reaction mixture for about 12 to 24 hours. The products may be recovered by evaporation of the reaction mixture followed by conventional purification techniques.

The 1-aminoloweralkoxybenzimidazoles of this invention serve as intermediates also for introducing a variety of additional substituents at the 1-position including biguanidoloweralkoxy, aminoguanidinoloweralkoxy, various N-loweralkyl guanidinoloweralkoxy and aminoguanidinoloweralkoxy groups and N-amidinoloweralkoxy and N-loweralkyl derivatives thereof. Thus, the 1-biguanidoloweralkoxy group may be introduced by treating the 1-aminoloweralkoxybenzimidazole at reflux in an acidic aqueous solvent with dicyandiamide followed by evaporation of the solvent and conventional recovery of the 1-(1-biguanido)loweralkoxybenzimidazole product. The aminoguanidinoloweralkoxy substituent may be added at the 1-position by treating the 1-aminoloweralkoxybenzimidazole with nitroguanidine at reflux in a suitable organic solvent to obtain the corresponding 1-nitroguanidinoloweralkoxybenzimidazole which is converted into a desired 1-aminoguanidinobenzimidazole by conventional catalytic reduction.

In order to prepare those benzimidazoles of this invention wherein the 1-substituent is a N-loweralkyl substituted guanidinoloweralkoxy or aminoguanidinoloweralkoxy group, the 1-aminoloweralkoxybenzimidazole intermediate (or an N-loweralkyl derivative thereof) first is converted into an appropriately substituted S-loweralkylisothiouronium salt by treating the 1-amino (or 1-loweralkylamino)loweralkoxybenzimidazole, as prepared above, with a loweralkylisothiocyanate or with a diloweralkylthiocarbamoyl halide to form the corresponding 1-(loweralkylthioureidoloweralkoxy)benzimidazole which then is alkylated by treatment with a loweralkyl halide, preferably methyl iodide, to form the corresponding S-loweralkylisothiouronium salt.

The S-loweralkylisothiouronium salts prepared above then may be treated with ammonia or a loweralkylamine to displace the loweralkylthio group and form any desired $N_{1'}$-, $N_{1}$-, $N_{2'}$- or $N_{1}$, $N_{2}$, $N_{3}$-loweralkylsubstituted 1-guanidinoloweralkyoxybenzimidazole. Similarly, the S-loweralkylisothiouronium salt may be treated with hydrazine or with any desired loweralkyl substituted hydrazine, such as, for example, 1-methylhydrazine, 1,1-diethylhydrazine, 1,1-dimethyl-2-ethylhydrazine and the like, to form corresponding N'-, $N_{1}$-, $N_{2}$- and $N_{3}$-loweralkyl substituted 1-aminoguanidinoloweralkoxybenzimidazoles.

Those benzimidazoles of this invention wherein the substituent at the 1-position is N-amidinoloweralkoxy or an N-loweralkyl derivative thereof may be prepared by treating the 1-aminoloweralkoxybenzimidazole intermediate with a loweralkyl ortho ester, such as, for example, trimethyl or triethyl orthoformate, ortho acetate, orthopropionate, orthobutyrate and the like, in the presence of a catalytic quantity of hydrochloric acid to form the corresponding methyl or ethyl imino ether which then may be treated with ammonia or a mono- or diloweralkylamine to form the desired 1-N-amidinoloweralkoxybenzimidazole or an N-loweralkyl derivative thereof. The hydrochloric acid catalyst may be added to the reaction mixture in the form of hydrochloric acid per se or, if desired, a catalytic quantity of the hydrochloride salt of the 1-aminoloweralkoxybenzimidazole may be employed as the source of the catalyst.

Alternatively, the 1-N-amidinoloweralkoxybenzimidazoles of this invention, and N-loweralkyl derivatives thereof, may be prepared directly by treating the 1-aminoloweralkoxybenzimidazole intermediate, or a N-loweralkyl derivative thereof, with a loweralkyl imino ester hydrochloride, such as, for example, the hydrochloride of methyl or ethyl formimidate, acetimidate, propionimidate and the like, in a suitable organic solvent. This reaction may be carried out at ambient temperatures and usually is complete in from 12 to 20 hours.

The 1-C-amidinoloweralkoxybenzimidazoles of this invention may be prepared by treating a 1-hydroxybenzimidazole starting material as described above with a haloloweralkylnitrile in the presence of a base to form the corresponding 1-(cyanoloweralkoxy)benzimidazole. This reaction is carried out by techniques already described. The 1-(cyanoloweralkoxy)benzimidazole intermediate then may be treated with ethanolic hydrogen chloride solution at about 0° C. to convert the nitrile group in the imino ethyl ester which then may be treated with ammonia or with a mono- or diloweralkylamine to form the desired C-amidinoloweralkoxybenzimidazole or an N-loweralkyl derivative thereof. Further alkylation of the C-amidinoloweralkoxybenzimidazoles so produced may be achieved by direct alkylation of the amidinoloweralkoxy group with a loweralkyl halide, preferably a loweralkyl iodide. The alkylation is usually carried out at reflux in a suitable organic solvent and generally is complete in about 8 to 16 hours. The products may be isolated as the hydroiodide salt or converted into the free base by conventional neutralization techniques.

The 1-loweralkylthioloweralkoxybenzimidazoles of this invention, which are prepared as described above, may be converted into the corresponding sulfoxide or sulfone derivative by oxidizing the 1-loweralkylthioloweralkoxybenzimidazole with an organic peracid such as peracetic acid, trifluoroperacetic acid and metachloroperbenzoic acid. One molar equivalent of the organic peracid is required for formation of the sulfoxide derivative and two molar equivalents of the organic peracid are needed to form the sulfone derivative. The oxidations may be carried out by the required quantity of organic peracid to a cold solution of the 1-loweralkylthioloweralkoxybenzimidazole in a suitable organic solvent. After the addition of peracid is complete the reaction mixture may be allowed to warm to room temperature and is stirred from 6 to 18 hours. After extraction of the reaction mixture with aqueous bicarbonate solution, the products may be recovered from the organic layer by conventional techniques.

Those benzimidazoles of this invention wherein the substituent at the 1-position is phosphatoloweralkoxy may be prepared by treating the corresponding 1-hydroxyloweralkoxybenzimidazole with a mixture of phosphoric acid anhydride and orthophosphoric acid at room temperature for 12-30 hours. Dilution of the reaction mixture with water precipitates the desired benzimidazole-1-yloxyloweralkyl phosphate which may be recovered and purified by coventional techniques. The 1-hydroxyloweralkoxybenzimidazole intermediate may be prepared by treating the 1-hydroxybenzimidazole starting material described above with a haloloweralkanol in the presence of a base in the manner previously described.

Where loweralkyl esters of the 1-phosphatoloweralkoxybenzimidazoles prepared above are desired, the 1-hydroxyloweralkoxybenzimidazole intermediate described above be treated with a mono- or diloweralkyl phosphoryl halide preferably the chloride, in a suitable organic solvent. The reaction is carried out at low temperatures, preferably between 0° C. and 5° C. and is usually complete in about 1 to 4 hours. Dilution of the reaction mixture with water followed by extraction with a suitable organic solvent and evaporation of the organic phase yields the desired 1-phosphatoloweralkoxy loweralkyl ether.

As noted above, those 1-ether benzimidazoles of this invention wherein the 1-substituent is of acidic character, such as carboxyloweralkoxy, sulfoloweralkoxy, phosphonoloweralkoxy, phosphotaloweralkoxy and α - aminocarboxyloweralkoxy, will form salts with alkali metals, alkaline earth metals and pharmaceutically acceptable amines. When the 1-ether benzimidazoles of this invention bear a substituent of basic character at the 1-position, such as aminoloweralkoxy C-amidinoloweralkoxy,
N-amidinoloweralkoxy,
biguanidinoloweralkoxy,
guanidinoloweralkoxy,
aminoguanidinoloweralkoxy,
imidazolylaminoloweralkoxy,
1,4,5,6-tetrahydropyrimidinylaminoloweralkoxy,
thiazolinylaminoloweralkoxy,
thiazinylaminoloweralkoxy imidazolinoloweralkoxy,
tetrahydropyrimidinoloweralkoxy and
α-aminocarboxyloweralkoxy, they will form salts with pharmaceutically acceptable acids. Many of these salts display greatly enhanced water solubility as compared with the parent benzimidazole and are highly useful in applications where water soluble formulations are desired. These salts may be formed by conventional techniques such as, for example, by contacting the 1-etherbenzimidazole with the desired acid or base followed by evaporation of the reaction mixture and conventional recovery and purification of the salt.

While all of the 1-ether and 1-ester benzimidazoles of this invention display anthelmintic and pesticidal activity as disclosed above, it will be obvious of course that these compounds will display varying degrees of potency depending upon the nature of the particular application contemplated and the severity of the infestation to be combatted. In general, the preferred benzimidazoles of this invention are those wherein the 1-substituent is loweralkoxy,
loweralkenyloxy,
carboxyloweralkoxy,
aminoloweralkoxy phosphonoloweralkoxy,
phosphatoloweralkoxy,
sulfoloweralkoxy,
C-amidinoloweralkoxy,
N-amidinoloweralkoxy,
biguanidoloweralkoxy,
guanidinoloweralkoxy,
aminoguanidinoloweralkoxy,
imidazolylaminoloweralkoxy,
1,4,5,6-tetrahydropyrimidinylaminoloweralkoxy,
thiazolinylaminoloweralkoxy,
thiazinylaminoloweralkoxy,
imidazolinoloweralkoxy,
1,4,5,6-tetrahydropyrimidinoloweralkoxy,
$\alpha$-aminocarboxyloweralkoxy or
glycosyloxy.

Of these, the more preferred compounds are those wherein the substituent at the 1-position is loweralkoxy, loweralkenyloxy, carboxyloweralkoxy, aminoloweralkoxy, C-amidinoloweralkoxy, N-amidinoloweralkoxy, guanidinoloweralkoxy, phosphonoloweralkoxy or sulfoloweralkoxy and especially preferred are trichloro compounds wherein the 2-substituent is trifluoromethyl. Typical of such compounds are, for example, 1-methoxy-2-trifluoromethyl-4,6,7-trichlorobenzimidazole,
1-n-ethoxy-2-trifluoromethyl-4,6,7-trichlorobenzimidazole,
4,6,7-trichloro-2-trifluoromethylbenzimidazol-1-yloxyacetic acid,
methyl-4,6,7-trichloro-2-trifluoromethylbenzimidazol-1-yloxyacetate, and
4,6,7-trichloro-2-trifluoromethylbenzimidazol-1-yl-2'-oxyethanesulfonic acid.

When the 1-ether and 1-ester benzimidazoles of this invention are employed for the treatment and control of helminthasis, the specific means employed for administering the benzimidazole to the animal is not critical and any of the methods now used or available for treating animals infected with, or susceptible to infection by helminths are satisfactory. Where it is desired to administer the benzimidazole in dry, solid unit dosage form, capsules, boluses or tablets containing the desired amount of benzimidazole usually are employed. These dosage forms are prepared by intimately and uniformly mixing the active ingredient with suitable finely divided diluents, fillers, disintegrating agents and/or binders such as starch, lactose, talc, magnesium stearate, vegetable gums and the like. Such unit dosage formulations may be varied widely with respect to their total weight and content of anthelmintic agent depending upon factors such as the type of host animal to be treated, the severity and type of infection and the weight of the host. For large animals such as sheep, swine and cattle, unit dosages up to 15 gm., containing from 3 to 12 gm. of benzimidazole, may be employed. It is usually preferred however, to employ unit dosages weighing from 5 to 10 gm. containing from 2 to 8 gm. of benzimidazole. Boluses as well as smaller size tablets contain various binders and lubricants and are compounded by techniques well-known in the art. Capsules are prepared readily by mixing the active ingredient with a diluent such as starch or lactose and filling into the capsule.

In order to treat infected animals by means of a drench, the 1-ether and 1-ester benzimidazoles of this invention are mixed with a suspending agent such as bentonite and the solid mix is added to water just prior to administration. Alternatively, ready to use drench formulations, such as those described in U.S. Pat. No. 2,918,403, may be employed. Preferred drench formulations containing from about 5 to 50% by weight of the benzimidazole.

The 1-ether and 1-ester benzimidazoles described herein also may be administered as a component of the feed of the animals or may be dissolved or suspended in the drinking water. Such compositions comprise the benzimidazole intimately dispersed in an inert carrier of diluent. By inert carrier, is meant one that will not react with benzimidazole and one that may be administered safely to animals. Preferably, the carrier is one that it, or may be, an ingredient of the animal ration.

Suitable compositions include feed supplements in which the active ingredient is present in relatively large amounts and which are suitable for addition to the feed either directly or after an intermediate dilution or blending step. Typical carriers or diluents suitable for such compositions include, for example, distillers' dried grains, corn meal, citrus meal, fermentation residues, ground oyster shells, wheat shorts, molasses solubles, corn cob meal, edible bean mill feed, soya grits, crushed limestone and the like. The active benzimidazoles are intimately dispersed throughout the carrier by methods such as grinding, stirring, milling or tumbling. Compositions containing from about 5 to 50%, by weight of the benzimidazole are particularly suitable as feed additives.

Examples of typical feed supplements containing the trihalo and tetrahalo benzimidazoles of this invention dispersed in a solid carrier are:

(A): Lbs.
1-butoxy - 2 - trifluoromethyl-4,6,7-trichlorobenzimidadole _____ 20
Corn distiller's dried grains _____ 80

(B):
4,6,7-trichloro - 2 - trifluoromethylbenzimidazol-1-yloxyacetic acid _____ 5
Wheat standard middling _____ 95

(C):
1 - [2 - (guanidino)ethoxy] - 2 - trifluoromethyl-4,6,7-trichlorobenzimidazole _____ 35
Wheat shorts _____ 65

(D):
2-(2 - trifluoromethyl-4,6,7-trichlorobenzimidazol-1-yl)-oxyethyl sulfonate _____ 50
Corn distiller's grains _____ 50

These, and similar feed supplements, are prepared by uniformly mixing the benzimidazole with the carrier.

Such supplements are added to the animal feed in an amount to give the finished feed the concentration of benzimidazole desired for the treatment and control of helminthiasis. Although the desired concentration of active will vary depending upon the factors previously mentioned as well as upon the particular benzimidazole employed, the trihalo and tetrahalo benzimidazoles of this invention are usually fed at concentrations of between 0.5 to 2.0% in the feed in order to achieve the desired anthelmintic result.

The 1-ether and 1-esterbenzimidazoles of this invention are effective pesticides in a variety of applications, such as, for example, as bacteriocides, nematocides and particularly as fungicides. Accordingly, they may be employed in the treatment of plants, soils, fruits, seeds, fur, wood, paint, textiles, cosmetics, leather, tobacco, rope, paper, pulp, plastic, fuel, rubber, food and the like.

It should be understood that the benzimidazole compounds may be utilized in diverse formulations, solids, including finely divided powders and granular materials as well as liquid, such as solutions, emulsions, suspensions, concentrates, emulsifiable concentrate, slurries and the like, depending upon the application intended and the formulation media desired. Thus, it will be appreciated that benzimidazoles of this invention may be employed to form pesticidally active compositions containing such compounds as essentially active ingredients thereof, which compositions may also include finely divided dry or liquid diluents, extenders, fillers, conditioners and excipients, including various clays, diatomaceous earth, talc, and the like, or water and various organic liquids such as lower alkanols, for example ethanol and isopropanol, or kerosene, benzene, toluene and other petroleum distillate fractions or mixtures thereof. The quantity of active benzimidazole contained in such formulations will vary widely depending upon the particular benzimidazole employed and the particular application intended. In general, useful formulations will contain from about 1 to about 95% of the active benzimidazole.

It should be understood also that the benzimidazoles of the invention may be used in combination one with the other as well as with other fungicidally active materials. For instance, the benzimidazoles disclosed above may be mixed with sorbic acid or its salts, propionic acid or its salts, mycostatin, sodium diacetate, trichomycin, amphotercin, griseofluvin, undecylenic acid, chloroquinadol, 5,7-dichloro-8-hydroxyquinoline (Vioform), sodium o-phenylphenate, o-phenylphenol, biphenyl, chlorinated phenols, sodium benzoate, dehydroacetic acid and its salts or esters of parahydroxybenzoic acid, such as the methyl and propyl ester (parabens) to give added fungicidal effect when used in appropriate concentrations. It is quite clear, too, that the benzimidazoles of this invention may be used in conjunction with other effective antibacterial materials in appropriate instances so as to combine the action of each in such a situation as to be particularly useful, for instance, in applications where the presence of bacteria creates undesirable results along side the detrimental action of fungi. Accordingly, a combination of antifungal and antibacterial agents will be useful in the preparation of germicidal soaps, in the production of cosmetics, and in food, such as beer, cheese, or meat and other leather applications.

It has been found that growth of various fungi existing in soil is limited or terminated by the addition to the soil of minor quantities of the benzimidazole compounds described. The term soil as used herein is intended to include all media capable of supporting the growth of plants and may include humus, sand, manure, compost, artificially created plant growth solution, and the like. It has been found also that the benzimidazoles of the invention are effective against fungal diseases of plants and may be effectively used either by direct contact with the foliage or systemically, by introduction through the roots.

The compounds of this invention also have activity against bacteria and plant nematodes and may, at appropriate levels of concentration, be effectively used to inhibit or prevent the growth of these organisms.

As fungicides, the benzimidazoles of the present invention are useful in inhibiting mold growth in fruit such as citrus fruit. The active agent may be applied at any time before consumption and preferably after harvesting. For instance the antifungal may be applied during initial storage, before or after shipping or during final storage before consumption. The benzimidazoles may be utilized in a number of ways in this regard and may be applied either directly to the fruit in an emulsion, solution, suspension or the like or it may be applied to the fruit container or wrapper. Suitable carriers for the active agents are waxes and other materials presently known in the art.

The best mode contemplated by applicants for carrying out their invention is set forth in the following examples; it being understood that these examples are for purposes of illustration merely and no limitation is intended except as set forth in the appended claims.

EXAMPLE 1

2,3,5-trichloro-6-trifluoroacetamidonitrobenzene

Reflux a mixture of 20 gm. of 2-nitro-3,4,6-trichloroaniline and 200 ml. of trifluoroacetic anhydride for 2 hours. Add hexane to precipitate the product and recover the precipitate by filtration to obtain 2,3,5-trichloro-6-trifluoroacetamidonitrobenzene (M.P. 125–126° C.).

By repeating the above process and substituting an equivalent quantity of any desired trihalo- or tetrahalo-o-nitroaniline for the 2-nitro-3,4,6-trichloroaniline starting material used above, there may be prepared the corresponding trihalo or tetrahalo trifluoroacetamidonitrobenzene. Thus, for example, 2-nitro-3,4,5,6-tetrachloroaniline, 2-nitro-3,5,6-tribromoaniline, 2 - nitro - 3,4,5-triiodoaniline and 2-nitro, 3,4,6-trifluoroaniline may be treated with trifluoroacetic anhydride to produce 2,3,4,5-tetrachloro-6-trifluoroacetamidonitrobenzene, 2,4,5 - tribromo-6-trifluoroacetamidonitrobenzene, 2,3,4 - triiodo-6-trifluoroacetamidonitrobenzene and 2,3,5 - trifluoro-6-trifluoroacetamidonitrobenzene, respectively.

EXAMPLE 2

2,3,4,5-tetrachloro-6-pentafluoropropionamidonitrobenzene

Mix 23 gm. of 2-nitro-3,4,5,6-tetrachloraniline and 200 ml. of pentafluoropropionic anhydride and reflux for 4 hours. Add hexane to precipitate the product and separate the precipitate from the reaction mixture by filtration to obtain 2,3,4,5-tetrachloro - 6 - pentafluoropropionamidonitrobenzene.

By repeating the above process and substituting an equivalent quantity of any desired trihalo- or tetrahalo-o-nitroaniline for the 2-nitro - 3,4,5,6 - tetrachloroaniline starting material used above, there may be prepared the corresponding trihalo or tetrahalo pentafluoropropionamidonitrobenzene. Thus, for example, 2-nitro-3,4,6-trichloroaniline, 2-nitro-3,5,6-trichloroaniline, 2-nitro-3,5,6-trichloroaniline, 2-nitro-3,4,5-tribromoaniline and 2-nitro-3,4,5,6-tetraiodoaniline may be treated with pentafluoropropionic anhydride to produce 2,3,5-trichloro-6-pentafluoropropionamidonitrobenzene, 2,4,5-trichloro-6-pentafluoropropionamidonitrobenzene, 2,3,4-tribromo-6-pentafluoropropionamidonitrobenzene and 2,3,4,5-tetraiodo-6-pentafluoropropionamidonitrobenzene, respectively.

EXAMPLE 3

1-hydroxy-4,6,7-trichloro-2-trifluoromethylbenzimidazole

Hydrogenate a solution of 17.5 gm. of 2,3,5-trichloro-6-trifluoroacetamidonitrobenzene in 1.5 liters of ethanol at 40 p.s.i. pressure using a palladium on carbon catalyst. Continue hydrogenation until 2 moles of hydrogen is absorbed. Separate the catalyst by filtration and evaporate the solvent. Crystallize the residue from benzene to obtain 1-hydroxy-4,6,7-trichloro - 2 - trifluoromethylbenzimidazole (M.P. 180° C.).

By repeating the above process and substituting an equivalent quantity of any desired trihalo or tetrahalo 6-pentafluoropropionamidonitrobenzene for the 2,3,5-trichloro-6-trifluoroacetaminonitrobenzene used above, the corresponding 1 - hydroxy-2-trifluoromethylbenzimidazole or 1 - hydroxy-2-pentafluoroethylbenzimidazole may be prepared. Thus, for example, 2,3,4,5-tetrachloro-6-trifluoroacetamidonitrobenzene,
2,4,5-tribromo-6-trifluoroacetamidonitrobenzene,
2,3,4-triiodo-6-fluoroacetamidonitrobenzene,
2,3,5-trifluoro-6-trifluoroacetamidonitrobenzene,
2,3,5-trichloro-6-pentafluoropropionamidonitrobenzene,
2,4,5-trichloro-6-pentafluoropropionamidonitrobenzene,
2,3,4-tribromo-6-pentafluoropropionamidonitrobenzene,
2,3,4,5-tetraiodo-6-pentafluoropropionamidonitrobenzene and
2,3,4,5-tetrachloro-6-pentafluoropropionamidonitrobenzene may be reductively cyclized to produce 1-hydroxy-4,5,6,7-tetrachloro-2-trifluoromethylbenzimidazole, 1-hydroxy-4,6,7-tribromo-2-trifluoromethylbenzimidazole,
1-hydroxy-4,5,6-triiodo-2-trifluoromethylbenzimidazole,
1-hydroxy-4,5,7-trifluoro-2-trifluoromethylbenzimidazole,
1- hydroxy-4,5,7-trichloro-2-pentafluoroethylbenzimidazole,
1-hydroxy-4,6,7-trichloro-2-pentafluoroethylbenzimidazole,
1-hydroxy-4,5,6-triiodo-2-pentafluoroethylbenzimidazole,
1-hydroxy-4,5,6,7-tetraiodo-2-pentafluoroethylbenzimidazole and
1-hydroxy-4,5,6,7-tetrachloro-2-pentafluoroethylbenzimidazole, respectively.

EXAMPLE 4

1-methoxy-4,6,7-trichloro-2-trifluoromethylbenzimidazole

Allow a solution of 100 mg. of 1-hydroxy-4,6,7-trichloro-2-trifluoromethylbenzimidazole, 29 mg. of sodium methoxide and 46 mg. of methyl iodide in 1.2 ml. of dimethylformamide to stand at room temperature for 24 hours. Add water to precipitate the product. Purify by recrystallization from hexane to obtain 1-methoxy-4,6,7-trichloro-2-trifluoromethylbenzimidazole (M.P. 117° C.).

By repeating the above process and substituting an equivalent quantity of any desired alkyl halide for the methyl iodide used above and/or an equivalent quantity of any desired trihalo or tetrahalo 1-hydroxy-2-trifluoromethylbenzimidazole or 1-hydroxy - 2 - pentafluoroethylbenzimidazole for the 1-hydroxy - 4,6,7 - trichloro-2-trifluoromethylbenzimidazole used above, the corresponding trihalo or tetrahalo 1-loweralkoxy-2-trifluoromethylbenzimidazole may be produced.

EXAMPLE 5

1-vinyloxy-4,5,6,7-tetrachloro-2-pentafluoroethylbenzimidazole

Reflux a solution of 110 mg. of 1-hydroxy-4,5,6,7-tetrachloro-2-pentafluoroethylbenzimidazole, 29 mg. of sodium methoxide and 60 mg. of ethylene bromide in 1.2 ml. of dimethylformamide for 6 hours. Cool the reaction mixture and flood with water to precipitate the product. Separate the precipitate by filtration and recrystallize from hexane to obtain 1-vinyloxy-4,5,6,7-tetrachloro-2-pentafluoroethylbenzimidazole.

By repeating the above process and substituting an equivalent quantity of any desired loweralkenyl halide for the ethylene bromide used above and/or any desired trihalo or tetrahalo 1-hydroxy - 2 - pentafluoroethylbenzimidazole or 1 - hydroxy-2-trifluoromethylbenzimidazole for the 1 - hydroxy-4,5,6,7-tetrachloro-2-pentafluoroethylbenzimidazole used above, the corresponding trihalo or tetrahalo 1 - loweralkenyloxy - 2 - pentafluoroethylbenzimidazole may be prepared.

EXAMPLE 6

4,6,7-trichloro-2-trifluoromethylbenzimidazol-1-yl-oxyacetic acid

Allow a solution of 457 mg. of 1-hydroxy-4,6,7-trichloro-2-trifluoromethylbenzimidazole, 83 mg. of sodium methoxide and 242 mg. of sodium bromoacetate in 5 ml. of dimethylformamide to stand at room temperature for 22 hours. Dilute the reaction mixture with water and acidify with acetic acid. Extract with methylene chloride. Evaporate the methylene chloride extract and purify the residue by recrystallization from ether to obtain 4,6,7-trichloro - 2-trifluoromethylbenzimidazol-1-yl-oxyacetic acid (M.P. 244–245° C.).

EXAMPLE 7

4,5,6,7-tetrachlor-2-pentafluoroethylbenzimidazol-1-yl-2'-oxypropionic acid

Reflux a solution of 550 mg. of 1-hydroxy-4,5,6,7-tetrachloro-2-pentafluoroethylbenzimidazole, 83 mg. of sodium methoxide and 255 mg. of sodium 2-bromopropionate in 5 ml. of dimethylformamide for 8 hours. Cool the reaction mixture, dilute with water and acidify with acetic acid. Extract the mixture with methylene chloride. Evaporate the methylene chloride and purify the residue by recrystallization from ether to obtain 4,5,6,7-tetrachloro - 2 - pentafluoromethylbenzimidazol - 1-yl-2'-oxypropionic acid.

Following the procedures of Examples 6 and 7 any desired trihalo or tetrahalo 1-hydroxy-2-trifluoromethylbenzimidazole or 1-hydroxy-2-pentafluoroethylbenzimidazole may be treated with a haloloweralkanoic acid to introduce any desired carboxyloweralkoxy group at the 1-position.

EXAMPLE 8

Methyl 4,6,7-trichloro-2-trifluoromethylbenzimidazol-1-yl-oxyacetate

Reflux for 24 hours a solution of 100 mg. of 1-hydroxy-4,6,7 - trichloromethyl - 2 - trifluoromethylbenzimidazole, 18 mg. of sodium methoxide and 56 mg. of methyl bromoacetate in 10 ml. of methanol. Evaporate excess solvent and recrystallize the residue from hexane to obtain methyl 4,6,7-trichloro-2-trifluoromethylbenzimidazol-1-yl-oxyacetate (M.P. 94–95° C.).

Similarly, any desired trihalo or tetrahalo 1-hydroxy-2-trifluoromethylbenzimidazole or 1-hydroxy-2-pentafluoroethylbenzimidazole may be treated with a haloloweralkanoic acid loweralkyl ether to introduce the corresponding 1-carboxyloweralkoxy loweralkyl ether group.

EXAMPLE 9

4,6,7-trichloro-2-trifluoromethylbenzimidazol-1-yl-2'-oxyethanesulfonic acid

Stir for 24 hours at room temperature a solution of 305 mg. of 1 - hydroxy-4,6,7-trichloro-2-trifluoromethylbenzimidazole, 54 mg. of sodium methoxide and 211 mg. of sodium 2-bromoethanesulfonate in 5 ml. of dimethylformamide. Add ether to precipitate product, sodium salt (M.P. 268-269° C.). Dissolve precipitate in water and acidify. Recover precipitate by filtration to obtain 4,6,7-trichloro - 2 - trifluoromethylbenzimidazol - 1-yl-2'-oxyethanesulfonic acid.

By repeating the above process, any trihalo or tetrahalo 1 - hydroxy 2 - trifluoromethylbenzimidazole or 1-hydroxy-2-pentafluoroethylbenzimidazole may be treated with a haloloweralkylsulfonic acid alkali metal salt to introduce the corresponding sulfoloweralkoxy group at the 1-position.'

EXAMPLE 10

2-(4,6,7-trichloro-2-trifluoromethylbenzimidazol-1-yloxy)-ethyl phosphonic acid

Mix 3.1 gm. of 1-hydroxy-4,6,7-trichloro-2-trifluoromethylbenzimidazole in 100 ml. of dry dimethylformamide and treat, portion wise, with 0.44 gm. of 54% sodium hydride. Heat the mixture on a steam bath for 15 minutes. Cool the reaction mixture and add 2.32 gm. of disodio 2-bromoethylphosphonic acid. Stir at room temperature for 16 hours. Pour the reaction mixture into water and extract with methylene chloride. Separate the aqueous layer and evaporate to a small volume. Acidify with dilute hydrochloric acid. Separate the product by filtration to obtain substantially pure 2-(4,6,7-trichloro-2-trifluoromethylbenzimidazol-1-yloxy)-ethyl phosphonic acid.

EXAMPLE 11

Diethyl 2-(4,6,7-trichloro-2-trifluoromethylbenzimidazol-1-yloxy)ethyl phosphonate React 3.1 gm. of 1-hydroxy-4,6,7-trichloro-2-trifluoromethylbenzimidazole, 0.44 gm. of 54% sodium hydride and 2.44 gm. of diethyl 2-bromoethylphosphonate, as in Example 10. Similar work-up will yield diethyl 2-(4,6,7- trichloro - 2 - trifluoromethylbenzimidazol-1-yloxy)ethyl phosphonate.

EXAMPLE 12

4,5,6,7-tetrachloro-2-trifluoromethylbenzimidazol-1-yloxymethyl methyl sulfide

Mix 10.0 gm. of 1-hydroxy-4,5-6-7-tetrachloro-2-trifluoromethylbenzimidazole in 100 ml. of dry dimethyl formamide and treat, portion wise, with 1.7 gm. of 54% sodium hydride. Heat the resultant suspension on the steam bath for 15 minutes to the cooled reaction mixture add 3.4 gm. of chloromethyl methyl sulfide dissolved in 5 ml. of dimethyl formamide and stir at room temperature for 16 hours. Pour onto 1200 ml. of water and extract with chloroform. After washing and drying evaporate the organic layer vacuo and recrystallize the residue from n-hexane to yield 4,5,6,7-tetrachloro-2-trifluoromethylbenzimidazol-1-yloxymethyl methyl sulfide.

EXAMPLE 13

1-($\alpha$-p-methoxyphenacyloxy)-2-pentafluoroethyl-4,6,7-trichlorobenzimidazole A solution of the sodio salt of hydroxy-2-pentafluoroethyl-4,6,7-trichlorobenzimidazole from 0.705 gm. of 1-hydroxy - 2 - pentafluoroethyl-4,6,7-trichlorobenzimidazole and 125 mg. of sodium hydride in 10 ml. of dry dimethyl formamide is prepared as in Example 12. To the cooled suspension is added 0.641 gm. of $\alpha$-bromo-p-methoxyacetophenone, dissolved in 2 mls. of dry dimethyl formamide. The reaction mixture is stirred at room temperature for 2 hours and poured onto 200 gms. of ice water mixture. The solids are collected by filtration, washed with water and dried in vacuo. Recrystallization from ethyl acetate yields pure 1-($\alpha$-p-methoxyphenacyloxy)-2-pentafluoroethyl-4,6,7-trichlorobenzimidazole.

EXAMPLE 14

1-($\alpha$-p-isopropylphenoxy)-2-pentafluoroethyl 4,6,7-trichlorobenzimidazole

React 0.705 gm. of 1-hydroxy-2-pentafluoroethyl-4,6,7-trichlorobenzimidazole, 125 mgs. of 54% soduim hydride and 0.250 gm. of a $\alpha$-bromo-p-isopropyl acetophenone as in Example 13, to obtain 1-($\alpha$-p-isopropylphenoxy)-2-pentafluoroethyl-4,6,7-trichlorobenzimidazole.

EXAMPLE 15

1-[(imidazolin-2-yl)methyleneoxy]-2-trifluoromethyl-4,6,7-trichlorobenzimidazole A solution of the sodio salt of 1-hydroxy-2-trifluoromethyl-4,6,7-trichlorobenzimidazole, prepared as in Example 10, is treated with a dimethylformamide solution containing a slight excess of 2-(chloromethyl)imidazoline. The reaction mixture is heated on the steam bath for 2 hours, cooled and poured onto ice water. The resultant mixture is extracted with chloroform and the extracts are washed with water, dried, and evaporated in vacuo. The residue is dissolved in CHCl$_3$ and anhydrous hydrogen chloride yields the crude dihydrochloride salt. Recrystallization from ethanol yields purified 1-[(imidazolin-2-yl)-methyleneoxy] - 2 - trifluoromethyl - 4,6,7 - trichlorobenzimidazole dihydrochloride.

EXAMPLE 16

1-(1,4,5,6-tetrahydropyrimidin-2-ylmethyleneoxy)-2-trifluoromethyl-4,6,7-trichlorobenzimidazole By repeating the process of Example 15 and substituting an equivalent quantity of 2-(bromomethyl)-1,4,5,6-tetrahydropyrimidine for the 2-(chloromethyl)imidazoline, 1-(1,4,5,6-tetrahydropyrimidin - 2 - ylmethyleneoxy) - 2-trifluoromethyl - 4,6,7 - trichlorobenzimidazole is obtained as the dihydrochloride salt.

EXAMPLE 17

1-[1-methyl-1,4,5,6-tetrahydropyrimidin-2-yl)methyleneoxy]-2-trifluoromethyl-4,6,7-trichlorobenzimidazole Repeat the process of Example 15 substituting an equivalent quantity of 2-bromomethyl-1-methyl-1,4,5,6-tetrahydropyrimidine for the 2-(bromomethyl-1-methyl-1,4,5,6-tetrahydropyrimidine for the 2-(chloromethyl)imidazoline to obtain 1-[1-methyl - 1,4,5,6 - tetrahydropyrimidin-2-yl)methyleneoxy] - 2 - trifluoromethyl - 4,6,7 - trichlorobenzimidazole as the dihydrochloride salt.

EXAMPLE 18

1-[1-ethyl-2-imidazolin-2-yl)methyleneoxy]-2-trifluoromethyl-4,6,7-trichlorobenzimidazole Repeat the process of Example 15 substituting an equivalent quantity of 2-(chloromethyl)-1-ethylimidazoline to obtain 1-[1-ethyl-2-imidazolin-2-yl)methyleneoxy]-2-trifluoromethyl - 4,6,7 - trichlorobenzimidazole as the dihydrochloride salt.

EXAMPLE 19

1-acetoxy-2-trifluoromethyl-4,6,7-trichlorobenzimidazole

A solution of 3.04 gm. of 1-hydroxy-2-trifluoromethyl-4,6,7-trichlorobenzimidazole in 10 ml. of pyridine, cooled to 0° C. is treated dispersed with 0.400 gm. of acetyl chloride. The resultant suspension is allowed to warm to room temperature and stirred for 2 hours. The reaction mixture is poured onto 200 gms. of ice water mixture and aged in the cold. The solids are separated by filtration, washed with water and dried in vacuo. Recrystallization from n-hexane yields pure 1-acetoxy-2-trifluoromethyl-4,6,7-trichlorobenzimidazole (M.P. 113–115° C.).

Substitution of the acetyl chloride used above with an equivalent quantity of propionyl chloride or butyrylchloride yields the propionyloxy or butyryloxy.

EXAMPLE 20

3-(2-trifluoromethyl-4,6,7-trichlorobenzimidazol-1-yloxy)-2-aminopropionate

React 3.0 gm. of 1-hydroxy-2-trifluoromethyl-4,6,7-trichlorobenzimidazole 1.7 gm. of 54% sodium hydride and 1.5 gm. of sodium-3-chloro-2-aminopropionate are reacted as in Example 9 to obtain 3-(2-trifluoromethyl-4,6,7-trichlorobenzimidazol-1-yloxy)-2-aminopropionate.

EXAMPLE 21

2-trifluoromethyl-4,5,6,7-tetrachlorobenzimidazol-1-yl-$\alpha$-D-glucoside

Using the same reaction as in Example 12, but substituting an equivalent quantity of 1-bromo-2,3,4,6-tetraacetyl-$\alpha$-D-glucose for the chloromethyl methyl sulfide, one obtains the 1-(2,3,4,6-tetraacetyl-$\alpha$-D-glucosyl-1-oxy)-2-(4'-thiazolyl)benzimidazole. The tetraacetyl compound is stirred at room temperature with dilute sodium hydroxide for 16 hours. Acidification of the reaction mixture yields 2-trifluoromethyl-4,5,6,7-tetrachlorobenzimidazol-1-yl-$\alpha$-D-glucoside.

EXAMPLE 22

1-(2-hydroxyethoxy)-2-trifluoromethyl-4,5,6,7-tetrachlorobenzimidazole

Mixing 3.4 gm. of 1-hydroxy-4,5,6,7-tetrachloro-2-trifluoromethyl-benzimidazole, 1.7 gm. of sodium hydride and 5.92 gm. of bromoethanol as in Example 12, but allowing reaction time to be shortened to 2 hours and reaction temperature to steam bath, one obtains 1-(2-hydroxyethoxy)-2-trifluoromethyl - 4,5,6,7 - tetrachlorobenzimidazole.

Following the procedure of Examples 12 and 22, any desired trihalo or tetrahalo 1-hydroxy-2-trifluoromethyl benzimidazole or 1-hydroxy-2-pentafluoroethylbenzimidazole may be treated with a haloloweralkanol to introduce any desired hydroxyloweralkoxy group at the 1-position.

EXAMPLE 23

1-(2'-cyanomethoxy)-2-trifluoromethyl-4,5,6,7-tetrachlorobenzimidazole

Reaction 3.4 gm. of 1-hydroxy-2-trifluoromethyl-4,5,6,7-tetrachlorobenzimidazole, 0.44 gm. of 54% sodium hydride and 0.75 gm. of chloroacetonitrile as in Example 12, one obtains 1-(2'-cyanomethoxy)-2-trifluoromethyl-4,5,6,7-tetrachlorobenzimidazole.

Following the procedure of Examples 12 and 23, any desired trihalo or tetrahalo 1-hydroxy-2-trifluoromethylbenzimidazole or 1-hydroxy-2-pentafluoroethylbenzimidazole may be treated with a haloloweralkylnitrile to introduce any desired cyanoloweralkoxy group at the 1-position.

EXAMPLE 24

1-(2-aminoethoxy)-4,5,7-tribromo-2-trifluoromethylbenzimidazole

Hold at room temperature for 24 hours a solution of 360 mg. of 1-hydroxy-4,5,7-tribromo-2-trifluoromethylbenzimidazole, 54 mg. of sodium methoxide and 254 mg. of N-(2-bromoethyl)phthalimide in 5 ml. of dimethylformamide. Add water and separate the precipitate by filtration to obtain 1-(N-phthalimidoethoxy)-4,5,7-tribromo-2-trifluoromethyl benzimidazole.

Reflux the product obtained above with 500 mg. of 100 percent hydrazine hydrate in 10 ml. of ethanol for 1 hour. Evaporate the solvent and extract the residue with 2 N hydrochloric acid. Basify the extract with aqueous sodium hydroxide. Separate the precipitate by filtration and recrystallize from hexane to obtain 1-(2-aminoethoxy)-4,5,7-tribromo-2-trifluoromethylbenzimidazole.

Similarly, any desired trihalo or tetrahalo 1-hydroxy-2-trifluoromethylbenzimidazole or 1-hydroxy - 2 - pentafluoroethylbenzimidazole may be treated with an N-(haloloweralkyl)phthalimide, followed by treatment with hydrazine hydrate, to introduce the corresponding 1-aminoloweralkoxy group.

EXAMPLE 25

1-(2-bromoethoxy)-4,6,7-trichloro-2-trifluoromethyl)-benzimidazole

Hold at room temperature for 24 hours a solution of 305 mg. of 1-hydroxy-4,6,7-trichloro-2-trifluoromethylbenzimidazole, 54 mg. of sodium methoxide and 1 gm. of 1,2-dibromoethane in 5 ml. of dimethylformamide. Dilute the reaction mixture with water and recover the precipitate by filtration. Recrystallize from hexane to obtain 1-(2-bromoethoxy)-4,6,7-trichloro-2-trifluoromethylbenzimidazole.

Any desired trihalo or tetrahalo 1-hydroxy-2-trifluoromethyl or 1 - hydroxy-2-pentafluoroethylbenzimidazole may be treated by the above process with a loweralkyl dihalide to produce the corresponding 1-haloloweralkoxy benzimidazole.

EXAMPLE 26

1-(2-methylaminoethoxy)-4,6,7-trichloro-2-trifluoromethylbenzimidazole

Heat at 100° C. for 6 hours a solution of 1 gm. of 1-(2-bromoethoxy) - 4,6,7 - trichloro-2-trifluoromethylbenzimidazole and 5 gm. of methylamine in 25 ml. of methanol. Evaporate the excess solvent and dilute the residue with water. Separate the precipitate by filtration and purify by recrystallization from hexane to obtain 1-(2 - methylaminoethoxy)-4,6,7-trichloro-2-trifluoromethylbenzimidazole.

EXAMPLE 27

1-(2-dimethylaminoethoxy)-4,6,7-trichloro-2-trifluoromethylbenzimidazole

Heat a solution of 1 gm. of 1-(2-bromoethoxy)-4,6,7-trichloro-2-trifluoromethylbenzimidazole and 5 gm. of dimethylamine in 25 ml. of methanol at 100° C. for 8 hours. Evaporate the solvent and dilute the residue with water. Recover the precipitate by filtration and recrystallize from hexane to obtain 1-(2-dimethylaminoethoxy)-4,6,7-trichloro-2-trifluoromethylbenzimidazole.

EXAMPLE 28

Trimethyl 2-(4,6,7-trichloro-2-trifluoromethylbenzimidazol-1-yl-oxyethyl)ammonium bromide Hold at room temperature a solution of 1 gm. of 1-(2-bromoethoxy) - 4,6,7 - trichloro-2-trifluoromethylbenzimidazole and 1 gm. of trimethylamine in 100 ml. of ether. Recover the product which slowly separates after 24 hours by filtration and recrystallize from hexane to obtain trimethyl - 2 - (4,6,7-trichloro-2-trifluoromethylbenzimidazol-1-yl-oxyethyl) ammonium bromide.

By repeating the process of Examples 12–14, any desired trihalo or tetrahalo 1-haloloweralkoxy-2-trifluoromethylbenzimidazole or 1-haloloweralkoxy-2-pentafluoroethylbenzimidazole may be treated with a loweralkylamine, a diloweralkylamine or a triloweralkylamine to introduce the corresponding N-loweralkylaminoloweralkoxy, N,N-diloweralkylaminoloweralkoxy or loweralkoxy triloweralkylammonium halide group at the 1-position.

EXAMPLE 29

1-[1-(6-amino)hexyloxy]-2-trifluoromethyl-4,5,7-tribromobenzimidazole

Using the same procedure as described in Example 24, but substituting an equivalent quantity of 1-phthalimido-6-bromohexane for the N-(2-bromoethyl)phthalimide, one obtains 1-[1-(6-amino)hexyloxy]-2-trifluoromethyl-4,5,7-tribromobenzimidazole.

EXAMPLE 30

1-[2-imidazolin-2-ylamino)ethoxy]-2-trifluoromethyl-4,6,7-trichlorobenzimidazole A solution of 35 gms. of 1-(2-aminoethoxy)-2-trifluoromethyl-4,6,7-trichlorobenzimidazole and 2.44 gms. of 2-methylthio-2-imidazoline hydroiodide in 60 ml. of ethanol is heated at reflux for 16 hours. The solvents are removed in vacuo and the residue is triturated with a small amount of water. The solids are removed by filtration and washed with cold water. Recrystallization of the crude product from ethanol yields 1-[2-imidazolin-2-ylamino)ethoxy]-2-trifluoromethyl-4,6,7-trichlorobenzimidazole as the hydroiodide salt.

EXAMPLE 31

1-[2-(1-methylimidazolin-2-ylamino)ethoxy]-2-pentafluoroethyl-4,5,6,7-tetrachlorobenzimidazole From the reaction of 4.0 gm. of 1-(2-aminoethoxy)-2-pentafluoroethyl - 4,5,6,7 - tetrachlorobenzimidazole and 2.5 gms. of 1-methyl-2-methylthio-2-imidazoline hydroiodide under the conditions of Example 30, one obtains 1-[2 - (1 - methylimidazolin-2-ylamino)ethoxy]-2-pentafluoroethyl-4,5,6,7-tetrachlorobenzimidazole as the hydroiodide salt.

EXAMPLE 32

1-[2-(1,4,5,6-tetrahydropyrimidin-2-ylamino)ethoxy]-2-trifluoromethyl-4,6,7-trichlorobenzimidazole By repeating the process of Example 30 and substituting an equivalent quantity of 2-methylthio-1,4,5,6-tetrahydropyrimidine hydroiodide for the 2-methylthio-2-imidazoline hydroiodide, one obtains 1-[2-(1-methyl-1,4,5,6 - tetrahydropyrimidin - 2 - ylamino)ethoxy]-2-trifluoromethyl-4,6,7-trichlorobenzimidazole as the hydroiodide salt.

EXAMPLE 33

1-[2-(1-methyl - 1,4,5,6 - tetrahydropyrimidin-2-ylamino) ethoxy]-2-trifluoromethyl-4,6,7-trichlorobenzimidazole By using an equivalent quantity of 1-methyl-2-methylthio-1,4,5,6-tetrahydropyrimidine hydroiodide in place of the 2-methylthio-2-imidazoline hydroiodine in Example 30, one obtains 1-[2-(1-methyl-1,4,5,6-tetrahydropyrimidin-2-ylamino)ethoxy] - 2 - trifluoromethyl - 4,6,7 - trichlorobenzimidazole as the hydroiodide salt.

EXAMPLE 34

1-[2-(2-thiazolin-2-ylamino)ethoxy]-2-trifluoromethyl-4,6,7-trichlorobenzimidazole By repeating the process of Example 30 and substituting an equivalent quantity of 2-methylthio-2-thiazoline hydroiodide for the 2-methylthio-2-imidazoline hydroiodide, one obtains 1-[2-(2-thiazolin-2-ylamino)ethoxy]-2 - trifluoromethyl - 4,6,7 - trichlorobenzimidazole as the hydroiodide salt.

EXAMPLE 35

1-[2-(2-guanidino)ethoxy]-2-pentafluoroethyl-4,5,6,7-tetrachlorobenzimidazole

A solution of 4.0 gms. of 1-(2-aminoethoxy)-2-pentafluoroethyl-4,5,6,7-trichlorobenzimidazole and 2.78 gms. of 2-methyl-2-thiopseudourea sulfate in 50 ml. of 50% aqueous ethanol, is refluxed for 16 hours. After evaporating the solvent, the residue is taken up in water, made strongly basic with 50% aqueous sodium hydroxide and the mixture is extracted with chloroform. The chloroform layer is separated, dried and anhydrous hydrogen chloride is introduced. The crude dihydrochloride salt is removed by filtration and washed twice with ether. Recrystallization from ethanol-ether mixture yields 1-[2-(2-guanidino)ethoxy]-2-pentafluoroethyl - 4,5,6,7 - tetrachlorobenzimidazole as the dihydrochloride salt.

EXAMPLE 36

1-[2-(1-biguanido)ethoxy]-2-trifluoromethyl-4,6,7-trichlorobenzimidazole

Reflux a solution of 3.5 gms. of 1-(2-aminoethoxy)-2-trifluoromethyl-4,6,7-trichlorobenzimidazole and 0.84 gm. of dicyandiamide in 100 ml. of water, containing 12 ml. of concentrated hydrochloric acid for one hour. Evaporate the solvent to a small volume and cool. Filter off 1-[2(1-biguanido)ethoxy]-2-trifluoromethyl - 4,6,7 - trichlorobenzimidazole as the hydrochloride salt.

EXAMPLE 37

1-[2-(N-aminoguanidino)ethoxy]-2-trifluoromethyl-4,6,7-trichlorobenzimidazole

Reflux a solution of 1-(2-aminoethoxy)-2-(4'-thiazolyl) benzimidazole, 3.5 gm., and 1.04 gm. of nitroguanidine in 100 ml. of ethanol for 3 hours. Evaporation of the ethanol solvent yields crude 1-[2-(N-nitroguanidino) ethoxy]-2-trifluoromethyl-4,6,7 - trichlorobenzimidazole. Dissolve the N-nitroguanidino product in ethanol and reduce with 10% palladium on carbon catalyst until 3 moles of hydrogen are absorbed. Remove the catalyst by filtration and evaporate the reaction mixture in vacuo. Dissolve the residue in ethanol containing an excess of anhydrous hydrogen chloride and dilute with ether to yield 1-[2-(N - aminoguanidino)ethoxy] - 2 - trifluoromethyl-4,6,7-trichlorobenzimidazole as the dihydrochloride salt.

EXAMPLE 38

1-[2-(1,3-dimethylguanidin-2-yl)ethoxy]-2-trifluoromethyl-4,6,7-trichlorobenzimidazole A solution of 2.76 gm. of 1-(2-aminoethoxy)-2-trifluoromethyl-4,6,7-trichlorobenzimidazole in 100 ml. of methylene chloride is treated with 50 ml. of a methylene chloride solution of 0.800 mg. of methyl isothiocyanate. The reaction is stirred for 16 hours at room temperature. The solvents are evaporated to dryness in vacuo and the residue is chromotographed over silica gel. Elution with ethyl acetate yields the purified 1-[β-(1-methylthioureido)ethoxy]-2-trifluoromethyl - 4,6,7 - trichlorobenzimidazole.

The thiourea is alkylated in a refluxing acetone containing 1 mole of methyl iodide. Evaporation of the solvent yields the crude S-methylisothiouronium hydroiodide salt. The salt is dissolved in ethanol and excess methyl amine is bubbled into the ethanolic solution on a steam bath. Evaporation of the ethanol solvent and recrystallization of the residue yields 1-[2-(1,3-dimethylguanidin-2-yl)ethoxy] - 2-trifluoromethyl-4,6,7-trichlorobenzimidazole as the hydroiodide salt.

EXAMPLE 39

1-[2-(1-methyl-2-guanidino)ethoxy]-2-trifluoromethyl-4,6,7-trichlorobenzimidazole Repeat the process of Example 38 treating the S-methylisothiouronium salt with anhydrous ammonia instead of methylamine to obtain 1-[2-(1-methyl-2-guanidino)ethoxy] - 2 - trifluoromethyl - 4,6,7 - trichlorobenzimidazole.

EXAMPLE 40

1-[2-(3-amino-1-methyl-2-guanidino)ethoxy]-2-trifluoromethyl-4,6,7-trichlorobenzimidazole Reflux the S-isothiouronium salt from Example 38 with an equimolar quantity of anhydrous hydrazine in ethanol for 3 hours. Evaporate the solvent, take up the residue in chloroform and bubble in hydrogen chloride. Dilute with ether and filter off the dihydrochloride salt of 1-[2-(3-amino-1-methyl-2-guanidino)ethoxy] - 2 - trifluoromethyl-4,6,7-trichlorobenzimidazole.

EXAMPLE 41

1-[2-(3-methylamino-1-methyl-2-guanidino)ethoxy]-2-trifluoromethyl-4,6,7-trichlorobenzimidazole Repeat the process of Example 40, using an equivalent quantity of 1-methylhydrazine in place of hydrazine, to obtain 1-[2-(3-methylamino - 1 - methyl - 2 - guanidino) ethoxy]-2-trifluoromethyl-4,6,7-trichlorobenzimidazole.

EXAMPLE 42

1-[2-(3-dimethylamino-1-methyl-2-guanidino)ethoxy]-2-trifluoromethyl-4,6,7-trichlorobenzimidazole Repeat the process of Example 40 using an equivalent quantity of 1,1-dimethylhydrazine in place of hydrazine, to obtain 1-[2-(3-dimethylamino-1-methyl-2-guanidino) ethoxy]-2-trifluoromethyl-4,6,7-trichlorobenzimidazole.

EXAMPLE 43

1-[2-(1,3-dimethyl-1-dimethylamino-2-guanidino) ethoxy]-2-trifluoromethyl-4,6,7-trichlorobenzimidazole Repeat the process of Example 40, using an equivalent quantity of 1,1,2-trimethylhydrazine in place of hydrazine, to obtain 1-[2-(1,3-dimethyl-1-dimethylamino-2-guanidino)ethoxy]-2-trifluoromethyl - 4,6,7 - trichlorobenzimidazole.

EXAMPLE 44

1-(2-chloroethoxy)-2-pentafluoroethyl-4,5,6,7-tetrachlorobenzimidazole

Reflux a solution of 600 mg. of 1-(2-hydroxyethoxy)-2-pentafluoroethyl-4,5,6,7 - tetrachlorobenzimidazole and 1 ml. of thionylchloride in 10 ml. of methylene chloride for 1 hour. Evaporate the solvent and recrystallize the residue from ethylacetate to obtain 1-(2-chloroethoxy)-2-pentafluoroethyl-4,5,6,7-tetrachlorobenzimidazole.

Any desired 1 - hydroxyloweralkoxybenzimidazole as prepared according to Example 22 by the reaction of the corresponding 1 - hydroxybenzimidazole with a haloloweralkanol, may be chlorinated by the technique described above to obtain the 1 - chloroloweralkoxy derivative.

EXAMPLE 45

1-(2-methylaminoethoxy)-2-pentafluoroethyl-4,5,6,7-tetrachlorobenzimidazole

Heat a solution of 414 mg. of 1 - (2 - chloroethoxy)-2 - pentafluoroethyl - 4,5,6,7 - tetrachlorobenzimidazole and 73 mg. of methylamine in 5 ml. of ethanol in a steam bath for 2 hours. Evaporate the solvent and recrystallize the residue from hexane to obtain 1-(2-methylaminoethoxy) - 2 - pentafluoroethyl - 4,5,6,7-tetrachlorobenzimidazole.

An equivalent quantity of any desired loweralkylamine may be substituted for the methylamine used above to introduce the corresponding loweralkylaminoloweralkoxy group at the 1-position.

EXAMPLE 46

1-[2-(1,2-dimethyl-2-quanidino)ethoxy]-2-trifluoromethyl-4,6,7-trichlorobenzimidazole Following the procedure of Example 38, react 1-(2-methylaminoethoxy) - 2 - trifluoromethyl - 4,6,7 - trichlorobenzimidazole with methylisothiocyanate to obtain 1 - [β-(1,3 - dimethylthioureido)-ethoxy] - 2-trifluoromethyl-4,6,7-trichlorobenzimidazole. Alkylate the thiourea with methyliodide to obtain the crude S-methylisothiouronium hydroiodide salt and treat with anhydrous ammonia as in Examples 38 and 39 to obtain 1-[2-(1,2-dimethyl - 2 - guanidino)ethoxy]-2-trifluoromethyl-4,6,7-trichlorobenzimidazole.

EXAMPLE 47

1-[2-(1,2,3-trimethyl-2-guanidino)ethoxy]-2-trifluoromethyl-4,6,7-trichlorobenzimidazole Repeat the process of Example 46, using methylamine in place of ammonia, to obtain 1 - [2 - (1,2,3 - trimethyl-2 - guanidino)ethoxy] - 2 - trifluoromethyl - 4,6,7-trichlorobenzimidazole.

EXAMPLE 48

1-[2-(3-amino-1,2-dimethyl-2-quanidino)ethoxy]-2-trifluoromethyl-4,6,7-trichlorobenzimidazole Following the procedure of Example 40, react the S-methylisothiouronium salt from Example 46 with hydrazine to obtain 1 - [2 - (3 - amino - 1,2 - dimethyl-2-guanidino)ethoxy] - 2 - trifluoromethyl - 4,6,7 - trichlorobenzimidazole.

EXAMPLE 49

1-[2-(1,2-dimethyl-3-methylamino-2-guanidino)ethoxy] 2-trifluoromethyl-4,6,7-trichlorobenzimidazole Following the procedure of Example 40, react the S-methylisothiouronium salt from Example 46 with an equivalent quantity of 1 - methylhydrazine in place of hydrazine to obtain 1 - [2 -(1,2 - dimethyl - 3-methylamino - 2 - guanidino)ethoxy] - 2 - trifluoromethyl-4,6,7-trichlorobenzimidazole.

EXAMPLE 50

1 - [2 - (1,2 - dimethyl - 2 - dimethylamino-2-guanidino) ethoxy] - 2 - trifluoromethyl - 4,6,7 - trichlorobenzimidazole Following the procedure of Example 40, react the S-methylisothiouronium salt from Example 46 with an equivalent quantity of 1,1-dimethylhydrazine in place of hydrazine to obtain 1 - [2 - (1,2 - dimethyl - 2 - dimethylamino - 2 - guanidino) ethoxy] - 2 - trifluoromethyl-4,6,7 - trichlorobenzimidazole.

EXAMPLE 51

1 - [2 - (1,2,3-trimethyl-1-dimethylamino-2-quanidino) ethoxy] - 2 - trifluoromethyl - 4,6,7 - trichlorobenzimidazole Following the procedure of Example 40, react the S-methylisothiouronium salt from Example 46 with an equivalent quantity of 1,1,2-trimethylhydrazine in place of hydrazine to obtain 1 - [2 - (1,2,3 - trimethyl - 1 - dimethylamino - 2 - guanidino)ethoxy] - 2-trifluoromethyl-4,6,7 - trichlorobenzimidazole.

EXAMPLE 52

1-[2-(1,1-dimethyl-2-guanidino)ethoxy]-2-trifluoromethyl-4,6,7-trichlorobenzimidazole Following the procedure of Example 38, react 1-(2-aminoethoxy) - 2 - trifluoromethyl - 4,6,7 - trichlorobenzimidazole with an equivalent quantity of dimethylthiocarbamoyl chloride in place of methylisothiocyanate to obtain 1 -[3 - (3,3 - dimethylthioureido)ethoxy] - 2-trifluoromethyl - 4,6,7 - trichlorobenzimidazole. Alkylate the thiourea with methyliodide to obtain the crude S-methylisothiouronium hydroiodide salt and treat with anhydrous ammonia as in Examples 38 and 39 to obtain 1-[2 - (1,1 - dimethyl - 2 - guanidino)ethoxy] - 2 - trifluoromethyl - 4,6,7 - trichlorobenzimidazole.

EXAMPLE 53

1-[2-(1,1,3-trimethyl-2-guanidino)ethoxy]-2-trifluoromethyl-4,6,7-trichlorobenzimidazole Repeat the process of Example 52, using methylamine in place of ammonia to obtain 1-[2-(1,1,3-trimethyl-2-guanidino)ethoxy] - 2 - trifluoromethyl - 4,6,7 - trichlorobenzimidazole.

EXAMPLE 54

1-[2-(3-amino-1,1-dimethyl-2-guanidino)ethoxy]-2-trifluoromethyl-4,6,7-trichlorobenzimidazole Following the procedure of Example 40, react the S-methylisothiouronium salt from Example 52 with hydrazine to obtain 1 - [2 - (3 - amino - 1,1 - dimethyl-2-guanidino)ethoxy]-2-trifluoromethyl - 4,6,7 - trichlorobenzimidazole.

EXAMPLE 55

1 - [2 - (3 - methylamino - 1,1 - dimethyl - 2 - guanidino) ethoxy] - 2 - trifluoromethyl - 4,6,7 - trichlorobenzimidazole Following the procedure of Example 40, react the S-methylisothiouronium salt from Example 52 with an equivalent quantity of 1-methylhydrazine in place of hydrazine to obtain 1 - [2 - (3 - methylamino - 1,1-dimethyl - 2 - guanidino)ethoxy] - 2 - trifluoromethyl-4,6,7 - trichlorobenzimidazole.

EXAMPLE 56

1 - [2 - (3 - dimethylamino - 1,1 - dimethyl-2-guanidino) ethoxy] - 2 - trifluoromethyl - 4,6,7 - trichlorobenzimidazole Following the procedure of Example 40, react the S-methylisothiouronium salt from Example 52 with an equivalent quantity of 1,1 - dimethylhydrazine in place of hydrazine to obtain 1 - [2 - (3 - dimethylamino-1,1-dimethyl - 2 - guanidino)ethoxy] - 2 - trifluoromethyl-4,6,7 - trichlorobenzimidazole.

EXAMPLE 57

1 - [2 - (1,1,2 - trimethyl - 2-dimethylamino-3-guanidino) ethoxy] - 2 - trifluoromethyl - 4,6,7 - trichlorobenzimidazole Following the procedure of Example 40, react the S-methylisothiouronium salt from Example 52 with an equivalent quantity of 1,1,2 - trimethylhydrazine in place of hydrazine to obtain 1 - [2 - (1,1,2 - trimethyl - 2-dimethylamino - 3 - guanidino)ethoxy] - 2 - trifluoromethyl-4,6,7-trichlorobenzimidazole.

EXAMPLE 58

1-[2-(N-methyl-N'-formamidino)ethoxy]-2-trifluoromethyl-4,6,7-trichlorobenzimidazole Mix 1.75 gm. of 1-(2-aminoethoxy)-2-trifluoromethyl-4,6,7-trichlorobenzimidazole, 0.888 g. triethylorthoformate and 0.026 gm. of 1-(2-aminoethoxy)-2-trifluoromethyl-4,6,7-trichlorobenzimidazole dihydrochloride and heat to reflux with a distillation column attached. Separate the ethanol which is produced by fractional distillation. When the distillation of ethanol is complete, evaporate the excess triethylorthoformate in vacuo. The residue is ethyl N-(2-trifluoromethyl-4,6,7-trichlorobenzimidazole-1-yloxyethyl) formimidate and is used without further purification.

Dissolved the residue in benzene and while heating on the steam bath, anhydrous methyl amine is bubbled into the reaction mixture. After ½ hour, the solvent is evaporated in vacuo and the residue is chromatographed as silica gel. Elute with varying amounts (from 1% methanol-99% chloroform to 10% methanol, 90% chloroform mixtures) solvent, to obtain purified 1-[2-(N-methyl-N'-formamidino)ethoxy] - 2 - trifluoromethyl-4,6,7-trichlorobenzimidazole.

EXAMPLE 59

1-[2-(N-methyl-N'-acetamidino)ethoxy]-2-trifluoromethyl-4,6,7-trichlorobenzimidazole By reacting 1-(2-aminoethoxy)-2-trifluoromethyl-4,6,7-trichlorobenzimidazole with triethylorthoacetate according to Example 58, one obtains the intermediate ethyl-N-(2-trifluoromethyl-4,6,7-trichlorobenzimidazole - 1 - yloxyethyl)-acetimidate which is reacted with methyl amine as in Example 58 to obtain 1-[2-(N-methyl-N'-acetamidino)ethoxy] - 2 - trifluoromethyl-4,6,7-trichlorobenzimidazole.

EXAMPLE 60

1-[2-(N',N'-dimethyl-N-formamidino)ethoxy]-2-trifluoromethyl-4,6,7-trichlorobenzimidazole React 1-(2-aminoethoxy) - 2 - trifluoromethyl-4,6,7-trichlorobenzimidazole with triethylorthoformate as in Example 58, but bubble in dimethylamine instead of methyl amine to obtain 1-[2-(N',N'-dimethyl-N-formamidino)ethoxy]-2-trifluoromethyl-4,6,7-trichlorobenzimidazole.

EXAMPLE 61

1-[2-(N,N'-dimethyl-N'-acetamidino)ethoxy]-2-trifluoromethyl-4,6,7-trichlorobenzimidazole React 1-(2-aminoethoxy) - 2 - trifluoromethyl-4,6,7-trichlorobenzimidazole and triethylorthoacetate as in Example 58 and bubble in dimethylamine, instead of methyl amine to yield 1-[2-(N,N'-dimethyl-N'-acetamidino)ethoxy]-2-trifluoromethyl-4,6,7-trichlorobenzimidazole.

EXAMPLE 62

1-[2-(N-formamidino)ethoxy]-2-trifluoromethyl-4,6,7-trichlorobenzimidazole

React 1-(2-aminoethoxy) - 2 - trifluoromethyl-4,6,7-trichlorobenzimidazole as in Example 58 with triethylorthoformate and bubble in ammonia instead of methylamine to yield 1-[2-(N-formamidino)ethoxy]-2-trifluoromethyl-4,6,7-trichlorobenzimidazole.

EXAMPLE 63

1-[2-(N-acetamidino)ethoxy]-2-trifluoromethyl-4,6,7-trichlorobenzimidazole

React 1-(2-aminoethoxy) - 2 - trifluoromethyl-4,6,7-trichlorobenzimidazole with triethylorthoacetate as in Example 58, but bubble in ammonia instead of methylamine to yield 1-[2-(N-acetamidino)ethoxy]-2-trifluoromethyl-4,6,7-trichlorobenzimidazole.

EXAMPLE 64

1-[2-(N-acetamidino)ethoxy]-2-trifluoromethyl-4,6,7-trichlorobenzimidazole

Dissolve 1.75 gm. of 1-(2-aminoethoxy-2-trifluoromethyl-4,6,7-trichlorobenzimidazole and 0.500 g. of ethylacetimidate hydrochloride in 20 ml. of ethanol. Stir the reaction mixture at room temperature for 16 hours. Evaporate the solvent and triturate with ether. Separate the product, as the hydrochloride salt by filtration and wash with ether. Suspend the material between chloroform and a water-ice mixture and treat with 50% sodium hydroxide. Separate, dry and evaporate the organic layer to yield 1-[2-(N-acetamidino)ethoxy]-2-trifluoromethyl-4,6,7-trichlorobenzimidazole.

EXAMPLE 65

1-[2-(N-methyl-N-acetamidino)ethoxy]-2-trifluoromethyl-4,6,7-trichlorobenzimidazole React 1.75 gm. of 1-(2-methylaminoethoxy)-2-trifluoromethyl-4,6,7-trichlorobenzimidazole as in Example 64 to yield 1-[2-(N-methyl-N-acetamidino)ethoxy]-2-trifluoromethyl-4,6,7-trichlorobenzimidazole.

Similarly, if 475 mg. of ethyl formimidate hydrochloride is substituted for the ethyl acetimidate hydrochloride, the product is 1-[2-(N-methyl-N-formamidino)ethoxy]-2-trifluoromethyl-4,6,7-trichlorobenzimidazole.

EXAMPLE 66

1-amidinomethoxy-2-trifluoromethyl-4,6,7-trichlorobenzimidazole

Stir 1.0 gm. of the 1-cyanomethoxy-2-trifluoromethyl-4,6,7-trichlorobenzimidazole from Example 23 in 150 ml. ethanolic hydrogen chloride solution at 0° C. for 16 hours. Dilute the reaction mixture with ether and separate the precipitate by filtration to obtain ethyl 2-trifluoromethyl - 4,6,7 - trichlorobenzimidazole-1-yloxyacetamidate dihydrochloride.

Without further purification, heat an ethanol solution of the acetimidate obtained above on a steam bath and bubble anhydrous ammonia through the solution for one hour. Evaporate the solvent and recrystallize the residue from ethanol to obtain 1-amidinomethoxy-2-trifluoromethyl-4,6,7-trichlorobenzimidazole as the dihydrochloride salt.

EXAMPLE 67

1-(N-methylamidinomethoxy)-2-trifluoromethyl-4,6,7-trichlorobenzimidazole

Following the procedure of Example 66, treat ethyl 2-trifluoromethyl - 4,6,7 - trichlorobenzimidazole-1-yloxyacetimidate with methylamine in place of ammonia to obtain 1 - (N-methylamidinomethoxy)-2-trifluoromethyl-4,6,7-trichlorobenzimidazole.

EXAMPLE 68

1-(N,N-dimethylamidinomethoxy)-2-trifluoromethyl-4,6,7-trichlorobenzimidazole

Following the procedure of Example 66, react ethyl 2-trifluoromethyl - 4,6,7 - trichlorobenzimidazole-1-yloxyacetimidate with dimethylamine in place of ammonia to obtain 1 - (N,N - dimethylamidinomethoxy)-2-trifluoromethyl-4,6,7-trichlorobenzimidazole.

EXAMPLE 69

1-(N,N'-dimethylamidinomethoxy-2-trifluoromethyl-4,6,7-trichlorobenzimidazole

Reflux an acetone solution of 1-(N-methylamidinomethoxy)-2-trifluoromethyl - 4,6,7 - trichlorobenzimidazole with an equimolar quantity of methyl iodide for 12 hours. Evaporate the solvent and recrystallize the residue from ethanol to obtain 1-(N,N'-dimethylamidinomethoxy)-2-trifluoromethyl-4,6,7-trichlorobenzimidazole as the hydroiodide salt.

EXAMPLE 70

1-(N,N,N'-trimethylamidinomethoxy)-2-trifluoromethyl-4,6,7-trichlorobenzimidazole Following the procedure of Example 69, react 1-(N,N-dimethylamidinomethoxy)-2-trifluoromethyl - 4,6,7 - trichlorobenzimidazole with methyl iodide to obtain 1-(N, N,N' - trimethylamidinomethoxy)-2-trifluoromethyl-4,6,7-trichlorobenzimidazole as the hydroiodide salt.

EXAMPLE 71

1-(N,N'-dimethylamidinomethoxy)-2-trifluoromethyl-4,6,7-trichlorobenzimidazole Following the procedure of Example 69, react 2 molar equivalents of methyl iodide with 1-amidinomethoxy-2-trifluoromethyl - 4,6,7 - trichlorobenzimidazole. Fractional crystallization yields 1-(N,N'-dimethylamidinomethoxy)-2-trifluoromethyl-4,6,7-trichlorobenzimidazole.

EXAMPLE 72

2-trifluoromethyl-4,6,7-trichlorobenzimidazol-1-yloxymethyl methylsulfone

Acetal 1.32 gm. of 85% metachloroperbenzoic acid to 1.5 gm. of 2-trifluoromethyl-4,6,7-trichlorobenzimidazol-1-yloxymethyl methylsulfide dissolve in 40 ml. of chloroform at 0°. Stir the mixture at room temperature overnight. Extract the solution with aqueous sodium bicarbonate and separate the organic layer. Evaporate the sovlent in vacuo. Recrystallize the residue from benzene to yield purified 2 - trifluoromethyl-4,6,7-trichlorobenzimidazol-1-yloxymethyl methylsulfone.

EXAMPLE 73

2-trifluoromethyl-4,6,7-trichlorobenzimidazol-1-yloxymethyl methylsulfoxide

To a cooled solution of 6.0 gm. of 2-trifluoromethyl-4,6,7 - trichlorobenzimidazol-1-yloxymethyl methylsulfide in 100 ml. of chloroform, add 2.85 gm. of 85% metachloroperbenzoic acid. Stir the resultant solution at room temperature for 12 hours. Extract the reaction mixture with aqueous sodium bicarbonate and separate the organic layer. After drying and evaporation of the solvent, recrystallize the residue from ethyl acetate to yield 2-trifluoromethyl-4,6,7-trichlorobenzimidazol-1-yloxymethyl methylsulfoxide.

EXAMPLE 74

2-trifluoromehtyl-4,6,7-trichlorobenzimidazole-1-yloxy-2'-ethyl phosphate

Mix 1.75 gm. of 1-hydroxyethoxy-2-trifluoromethyl-4,6,7-trichlorobenzimidazole, 5.5 gm. of phosphoric acid anhydride and 6.85 gm. of orthophosphoric acid. Stir the mixture at room temperature for 24 hours. Flood the reaction mixture with water and separate the precipitate by filtration to obtain 2-trifluoromethyl-4,6,7-trichlorobenzimidazole-1-yloxy-2'-ethyl phosphate.

EXAMPLE 75

2-trifluoromethyl-4,5,6,7-tetrachlorobenzimidazole-1-yloxy-2'-ethyl diethylphosphate Dissolve 3.75 gm. of 1-(2-hydroxyethoxy)-2-trifluoromethyl-4,5,6,7-tetrachlorobenzimidazole in 20 ml. of dry pyridine, held at 0° C. Add 1.71 g. of diethylphosphoryl chloride dropwise while maintaining a temperature of 0° to 5°. After addition is complete, stir at room temperature for 2 hours, dilute with water, extract with chloroform and evaporate the dried chloroform extract. Chromatography of the residue over silica gel and elution with ethyl acetate yields pure 2-trifluoromethyl-4,5,6,7-tetrachlorobenzimidazole-1-yloxy-2'-ethyl diethylphosphate.

What is claimed is:

1. A compound selected from the group consisting of benzimidazoles having the formula:

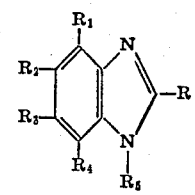

wherein

R is a member selected from the group consisting of trifluoromethyl and pentafluoroethyl;

$R_1$, $R_2$, $R_3$ and $R_4$ are members selected from the group consisting of hydrogen and halogen selected from the group consisting of fluorine, chlorine, bromine and iodine, provided that only one of $R_1$, $R_2$, $R_3$ and $R_4$ can be hydrogen; and $R_5$ is a member selected from the group consisting of loweralkoxy, loweralkenyloxy and carboxyloweralkoxy and loweralkyl esters thereof;

and alkali metal, alkaline earth metal and pharmaceutically acceptable amine salts thereof when $R_5$ is carboxyloweralkoxy.

2. The compound of claim 1 which is 1-methoxy-2-trifluoromethyl-4,6,7-trichlorobenzimidazole.

3. The compound of claim 1 which is 1-n-ethoxy-2-trifluoromethyl-4,6,7-trichlorobenzimidazole.

4. The compound of claim 1 which is 4,6,7-trichloro-2-trifluoromethylbenzimidazole-1-yloxyacetic acid.

5. The compound of claim 1 which is methyl-4,6,7-trichloro-2-trifluoromethylbenzimidazol-1-yloxyacetate.

References Cited

Derwent AGDOC Complete Specifications Book No. 382, pp. 51–60 (No. 8907, Belgium 734,835) issued Jan. 28, 1970.

NATALIE TROUSOF, Primary Examiner

U.S. Cl. X.R.

260—210 R, 243 R, 247.1, 247.2 R, 256.4 H, 268 BC, 306.7, 562 B; 424—180, 200, 246, 248, 250, 251, 270, 273